(12) United States Patent  
Nakamura et al.

(10) Patent No.: US 7,837,368 B2
(45) Date of Patent: Nov. 23, 2010

(54) VEHICULAR LAMP

(75) Inventors: Hiromi Nakamura, Shizuoka (JP); Hironori Tsukamoto, Shizuoka (JP)

(73) Assignee: Koito Manfacturing Co., Ltd., Tokyo (JP)

( * ) Notice: Subject to any disclaimer, the term of this patent is extended or adjusted under 35 U.S.C. 154(b) by 202 days.

(21) Appl. No.: 12/184,405

(22) Filed: Aug. 1, 2008

(65) Prior Publication Data

US 2009/0034282 A1    Feb. 5, 2009

(30) Foreign Application Priority Data

Aug. 2, 2007   (JP) ............................. 2007-202163
Jun. 11, 2008  (JP) ............................. 2008-152509

(51) Int. Cl.
*F21S 8/10*    (2006.01)

(52) U.S. Cl. ...................... 362/544; 362/545; 362/518

(58) Field of Classification Search ................. 362/544, 362/545, 516, 518
See application file for complete search history.

(56) References Cited

U.S. PATENT DOCUMENTS

| | | | |
|---|---|---|---|
| 4,831,502 A | 5/1989 | Fujino et al. | |
| 5,580,156 A | 12/1996 | Suzuki et al. | |
| 6,190,030 B1 | 2/2001 | Chase | |
| 2003/0086276 A1 | 5/2003 | Ohtsuka et al. | |
| 2004/0061963 A1* | 4/2004 | Inaba et al. | 359/883 |
| 2006/0104077 A1 | 5/2006 | Oshio et al. | |

FOREIGN PATENT DOCUMENTS

| EP | 1 318 577 A | 6/2003 |
|---|---|---|
| JP | 06-076609 A | 3/1994 |
| JP | 11-238401 A | 8/1999 |

OTHER PUBLICATIONS

European Search Report issued in European Application No. EP 08 01 3862 dated Sep. 30, 2008, 9 pages.
Patent Abstracts of Japan, Publication No. 11238401, Publication Date: Aug. 31, 1999, 1 page.

* cited by examiner

*Primary Examiner*—David V Bruce
(74) *Attorney, Agent, or Firm*—Osha Liang LLP (57) ABSTRACT

A vehicular lamp includes a plurality of light sources; a lamp chamber for housing the plurality of light sources; and a bounding member for bounding the plurality of light sources in the lamp chamber. The bounding member includes a sheet-like material integrally formed into a predetermined shape so that one or more bounding walls are provided between or among the plurality of light sources. A vehicular lamp includes a plurality of lamp units; a lamp chamber for housing the plurality of lamp units; and a bounding member for bounding the plurality of lamp units in the lamp chamber. The bounding member includes a sheet-like material integrally formed into a predetermined shape so that one or more bounding walls are provided between or among the plurality of lamp units.

20 Claims, 11 Drawing Sheets

VEHICULAR LAMP

BACKGROUND OF INVENTION

1. Field of the Invention

The present invention relates to a vehicular lamp and, more particularly, to a vehicular lamp provided with a bounding member for bounding a plurality of lamp units or a plurality of light sources.

2. Background Art

Vehicular lamps each have a bounding member for bounding at least a plurality of lamp units or a plurality of light sources in a lamp chamber formed of a lamp body and a lamp cover.

Generally, a reflector, an extension, or an extension reflector is used as the bounding member. Incidentally, the extension reflector is a reflector for ornamental purpose, which is provided around a unit type lamp. When a lamp is externally observed, the extension reflector appears lightly, and improves the appearance of the entire lamp.

Previously, an article produced by bending a metal plate has been used as the bounding member. However, in a case where the shape of the bounding member is complex, the bounding member has problems in that it is extremely difficult to bend a metal plate, and that the manufacturing cost thereof is increased.

Thus, an extension reflector disclosed in, e.g., Patent Document 1 is formed by molding a resin and depositing aluminum on a surface of the molded resin. This extension reflector has a rectangular-tube-like fixing portion provided on a rear portion that protrudes rearwardly. The extension reflector is fixed to a lamp body by inserting a bolt into the fixing portion and screwing a nut onto the bolt.

Such an extension reflector is configured such that an opaque under coat is applied to a surface of this transparent resin member, and that a reflecting treatment is performed on a surface of this under coat. Thus, the extension reflector can easily be manufactured at low cost. In addition, a degraded appearance thereof can be improved. However, the fixing portion is brought into a transparent state, without applying an under coat and a reflecting treatment thereto. Consequently, a user can see through the fixing bolt and can easily perform an operation of fixing the extension reflector.

[Patent Document 1] JP-A-6-76609

SUMMARY OF INVENTION

However, the extension reflector made of the transparent resin has a thickness of about 2 mm and is heavy. Thus, when mounted on a vehicle body, such an extension reflector has a disadvantage for improvement of the fuel cost of a vehicle. The larger the extension reflector becomes, the heavier the weight of the extension reflector becomes. Thus, a necessary mounting strength for mounting the extension reflector on the vehicle body increases. Accordingly, an attaching portion for attaching the extension reflector to the vehicle body is increased in size. Consequently, the weight of the vehicle body further increases.

On the other hand, a reflector may be made of a sheet-like material in order to reduce the weight of the reflector. However, because the thickness of the reflector is thin, it is difficult to assure the stiffness thereof. Particularly, a large-sized extension reflector is difficult to manufacture. This is because a distortion is generated in the large-sized extension reflector.

Accordingly, one or more embodiments of the invention provide a vehicular lamp having lightweight high-stiffness extension and reflector, which reduces the manufacturing cost of a vehicle and improves the fuel cost thereof.

One or more embodiments of the invention involve a vehicular lamp having a bounding member for bounding at least a plurality of lamp units or a plurality of light sources in a lamp chamber.

The vehicular lamp is characterized in that the bounding member is integrally formed into a predetermined shape using a sheet-like material so that one or more bounding walls are provided between or among at least the plurality of lamp units or the plurality of light sources.

According to the vehicular lamp of the aforementioned configuration, the bounding walls protruding in the light exit direction of each of the light sources are provided at least between or among the lamp units or the light sources. Thus, the bounding member becomes a three-dimensional structure using the bounding walls. Consequently, the bounding member assures high stiffness. In addition, the bounding member is integrally formed using a sheet-like material. Thus, the bounding member is reduced in weight. Consequently, a necessary mounting strength for mounting the bounding member on a vehicle body can be reduced. Further, a structure, such as a large-area reflector integrated type extension for a combination lamp, having a complex shape and a large size can be integrally formed. Accordingly, a bounding member can be formed at low cost to have a good looking shape, which is made similar to the reflector and is freely patterned, around each light source.

Incidentally, in the vehicular lamp, the light sources may be formed of semiconductor light emitting elements. The bounding member constitutes an extension for bounding the plurality of light sources.

According to the vehicular lamp of such a configuration, the light sources are formed of semiconductor light emitting elements. Thus, the bounding member can be formed as an extension that needs no optical design. In this case, the distance between the adjacent light sources is short. Thus, the bounding member for bounding the light sources is compacted. Consequently, the bounding member can easily assure stiffness. In addition, in a case where each light source is formed of a semiconductor light emitting element having a low heat value, there is no necessity for considering the heat resistance of the bounding member. Thus, the bounding member can have a shape, which is made similar to the reflector and is freely patterned, around each light source. Consequently, the appearance of the vehicular lamp can be improved.

Further, in the vehicular lamp, the bounding member may constitute an extension for bounding the plurality of lamp units.

According to the vehicle lamp of such a configuration, the large-area extension extending over the entire lamp unit can be manufactured using a sheet-like material. Consequently, the weight of the entire vehicular lamp is reduced. Accordingly, a lower fuel cost can be attained.

Furthermore, in the vehicular lamp, convex portions deformable for absorbing assembling errors may be provided at predetermined intervals on a peripheral edge of the bounding member.

The lamp body and the lamp cover fix the bounding member by sandwiching the convex portions.

According to the vehicular lamp of such a configuration, the deformable convex portions are provided on the peripheral edge of the bounding member fixed by being sandwiched between the lamp body and the lamp cover. Thus, the convex portions are collapsed according to the fixed gap between the lamp body and the lamp cover, which varies with a dimension tolerance. Consequently, even a thin sheet-like material can be surely sandwiched and fixed. In addition, because the bounding member is made of a sheet-like material, the shape of the entire bounding member is not affected even when the convex portions are collapsed.

Moreover, in the vehicular lamp, convex portions deformable for absorbing assembling errors may be provided at predetermined intervals on a peripheral edge of the bounding member In addition, two ribs at the side of a molded extension and one rib at the side of the lamp unit fix the bounding member by sandwiching the convex portions.

According to the vehicular lamp of such a configuration, each of the convex portions, against the rear side (concave portion side) of each of which the two ribs at the side of the molded extension side abut, is sandwiched by the two ribs at the molded extension side and the one rib at the lamp unit side opposed thereto. Thus, the convex portion can deform at a large amount of deformation in a wide range of shapes from a shape, in which the convex portion protrudes towards the one rib at the lamp unit side, to a shape in which the convex portion protrudes towards the side of the two rib at the molded extension side. That is, even in a case where the mounting error at the side of the lamp unit is large, a collapsed amount of the convex portion is largely changed. Thus, even in a case where a thin sheet-like material is used, the bounding member can be surely sandwiched and fixed. Incidentally, in this case, the relative positions of the molded extension and the bounding member are made by the abutment between the molded extension and the remaining part of the bounding member other than the convex portions to be always fixed.

Further, in the vehicular lamp, the bounding member may constitute an extension formed integrally with a reflector corresponding to the plurality of light sources.

According to the vehicular lamp of such a configuration, a sheet-like material is configured into a three-dimensional structure using the bounding walls by being produced integrally with the extension. Thus, a high stiffness is assured, so that a distortion is hard to occur. Consequently, this vehicular lamp can solve the drawbacks in that stiffness is insufficient when a single reflector is manufactured using a sheet-like material, and that the structure is distorted due to vibrations generated during running of a vehicle.

According to the vehicular lamp of one or more embodiments of the invention, the sheet-like material is configured into a three-dimensional structure using the bounding walls. Even in a case where the sheet-like material is formed into a large-area reflector integrated type extension for a combination lamp or the like, stiffness can be assured. Consequently, reduction in weight can be achieved. In addition, a necessary mounting strength can be reduced. Accordingly, the manufacturing cost and the material cost can be reduced. Additionally, a structure having a complex shape and a large size can be integrally formed. Thus, a bounding member can be formed at low cost to have a good look shape, which is made similar to the reflector and is freely patterned, around each light source. Consequently, the appearance of the vehicular lamp can be improved.

Other aspects and advantages of the invention will be apparent from the following description, the drawings and the claims.

DETAILED DESCRIPTION

Hereinafter, preferred embodiments of a vehicular lamp according to the invention are described in detail with reference to the accompanying drawings.

Figure 1:
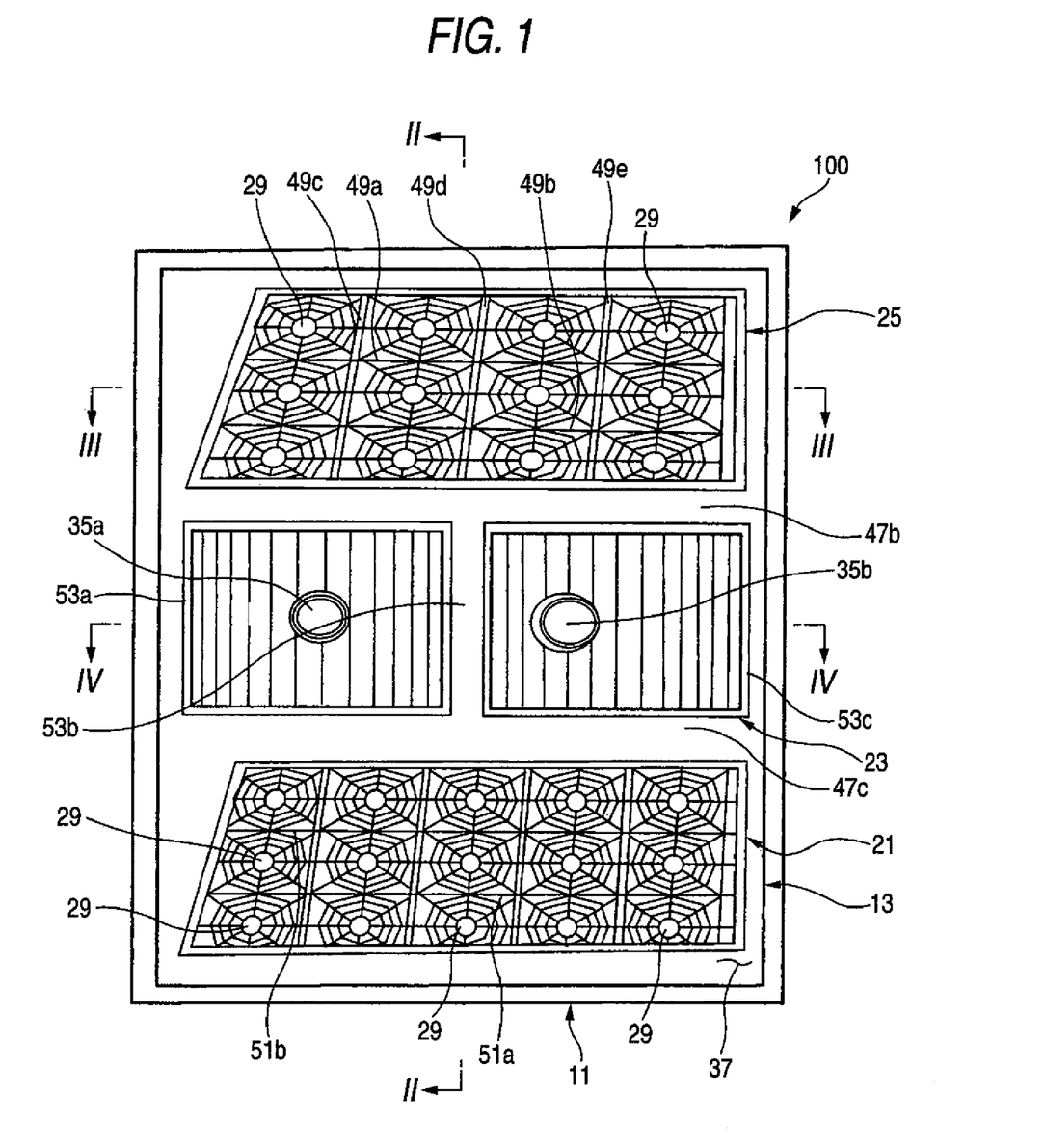
FIG. 1 is a front view illustrating a vehicular lamp according to a first embodiment of the invention.
Figure 2:
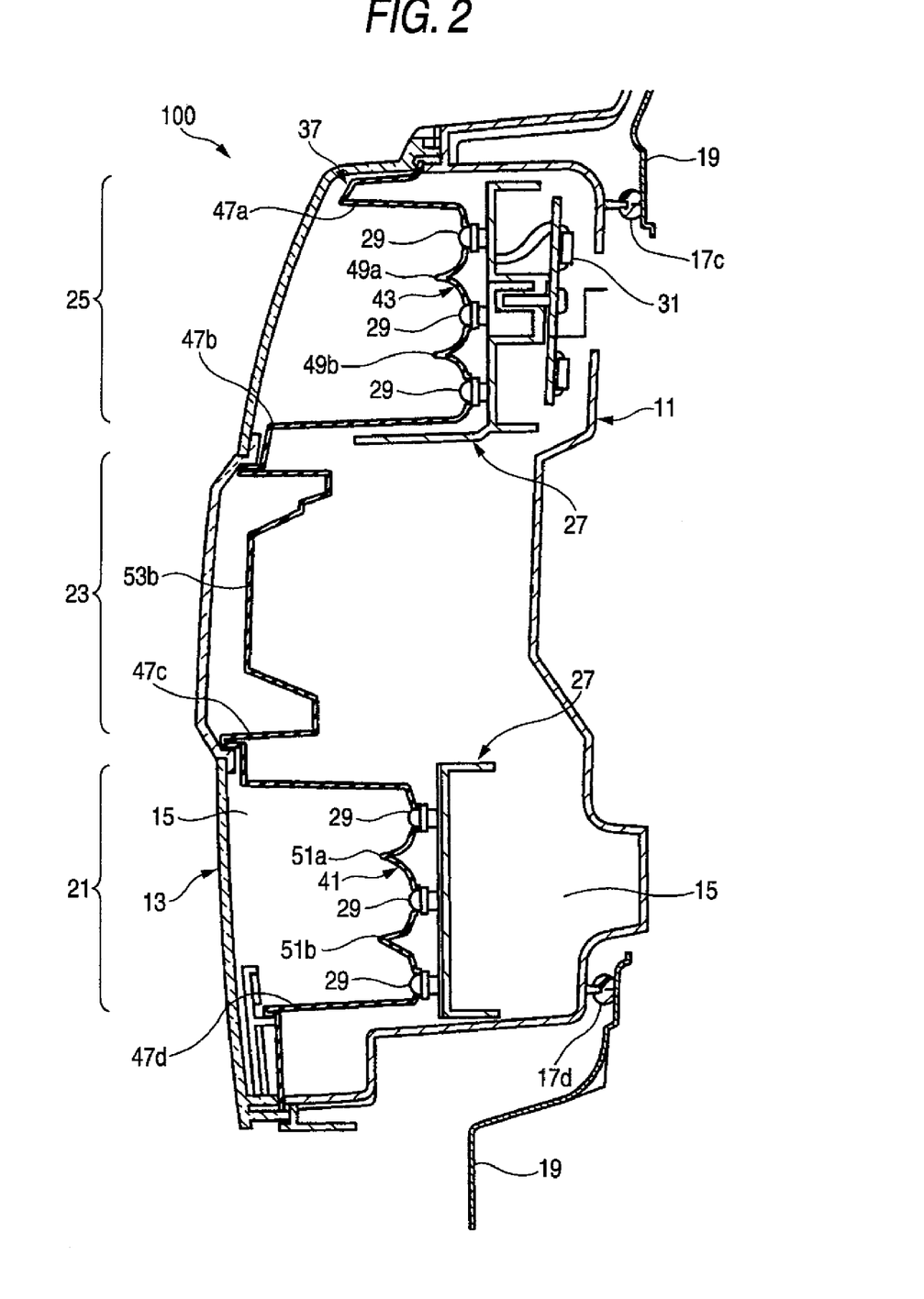
FIG. 2 is a cross-sectional view taken in the direction of arrows II-II illustrated in FIG. 1.
Figure 3:
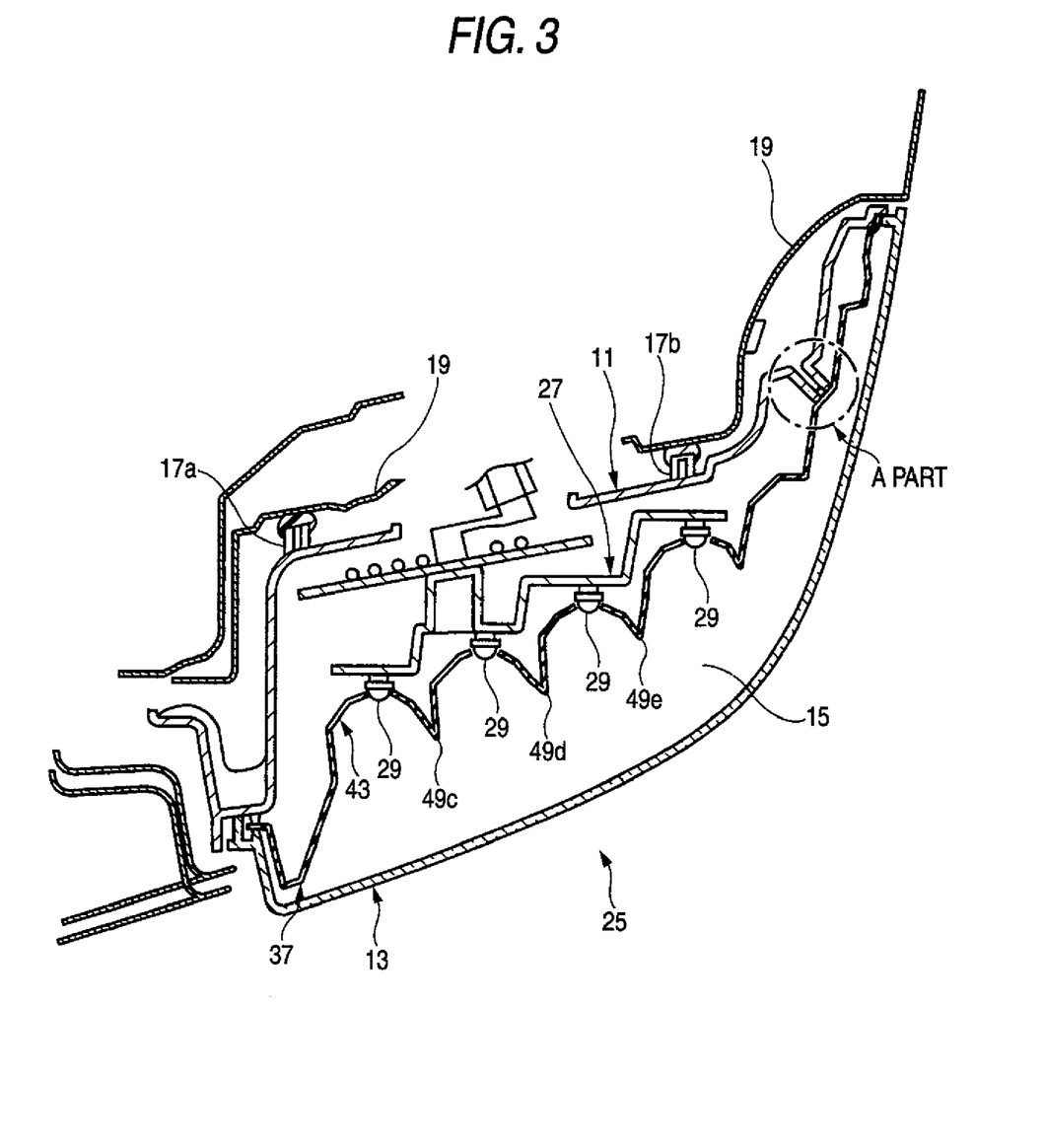
FIG. 3 is a cross-sectional view taken in the direction of arrows III-III illustrated in FIG. 1.
Figure 4:
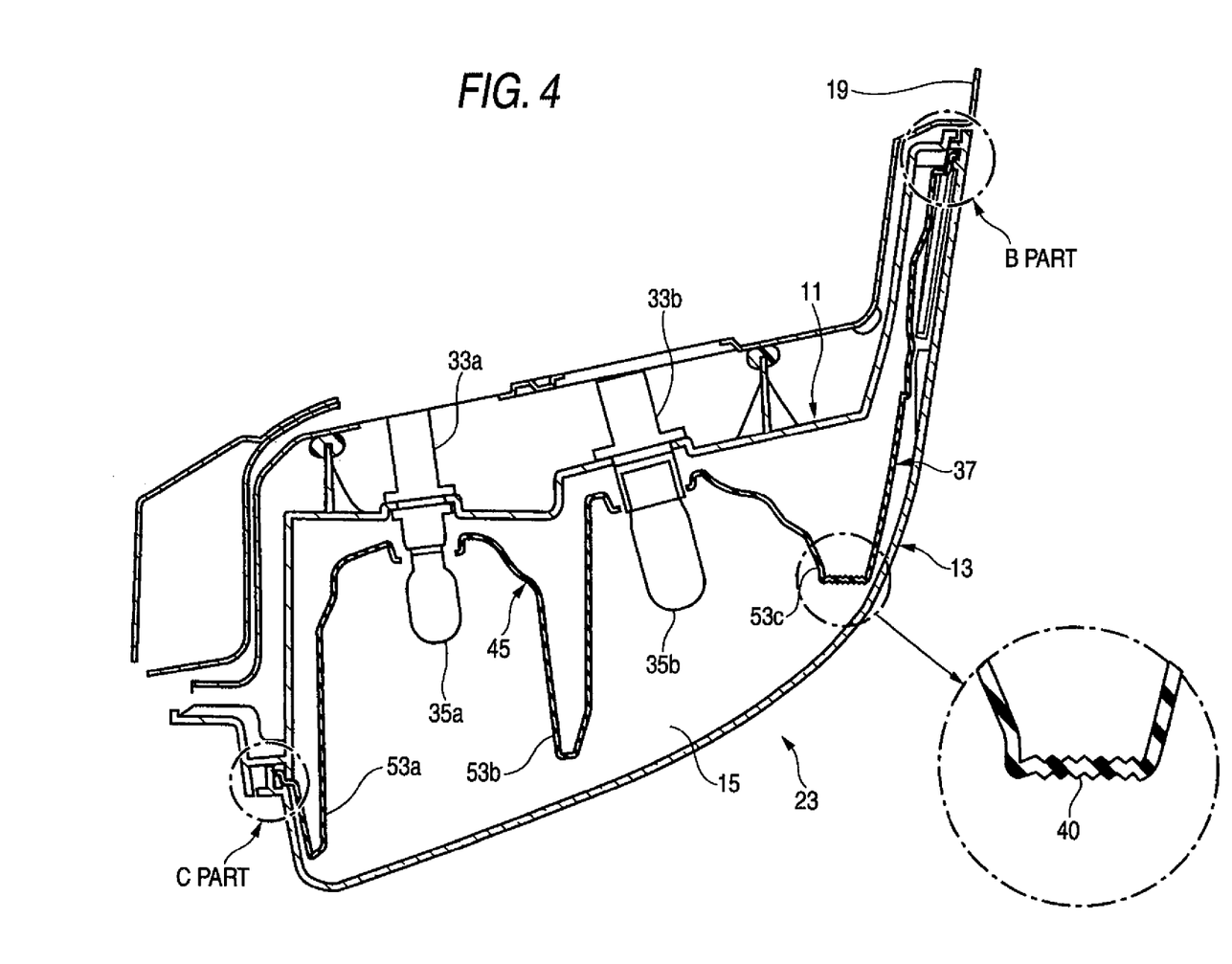
FIG. 4 is a cross-sectional view taken in the direction of arrows IV-IV illustrated in FIG. 1.

FIG. 1 is a front view illustrating a vehicular lamp according to a first embodiment of the invention. FIG. 2 is a cross-sectional view taken in the direction of arrows II-II illustrated in FIG. 1. FIG. 3 is a cross-sectional view taken in the direction of arrows III-III illustrated in FIG. 1. FIG. 4 is a cross-sectional view taken in the direction of arrows IV-IV illustrated in FIG. 1. In FIGS. 3 and 4, each partial enlarged view illustrates a case where a part of the extension made of a sheet-like material is a reflex reflector (RR).

In the following description of the first embodiment of the invention, e.g., a rear combination lamp provided in a rear portion of a vehicle is described as an example of a vehicular lamp 100. However, the vehicular lamp according to the invention can be applied to a headlamp or the like.

As illustrated in FIGS. 1 and 2, the vehicular lamp 100 includes a lamp chamber 15 formed of a lamp body 11 and a lamp cover 13.

As illustrated in FIGS. 2 and 3, the lamp body 11 is fixed to a vehicle body panel 19 via a plurality of fixing portions 17a, 17b, 17c, and 17d or the like provided on a rear surface to protrude therefrom. A plurality of stages (three stages in the example illustrated in FIGS. 2 and 3) of lamp units are provided in the lamp chamber 15. A lower stage lamp unit is configured as a back lamp 21. A middle stage lamp unit is configured as a brake lamp 23. An upper stage lamp unit is configured as a side marker lamp 25.

In the lamp chamber 15, a base panel 27 is provided over the back lamp 21, the brake lamp 23, and the wide marker lamp 25. The base panel 27 is supported by and fixed to the lamp body 11. The base panel 27 can be formed integrally therewith. Alternatively, the base panel 27 can be formed by integrally connecting panels which are separately formed corresponding to the back lamp 21, the brake lamp 23, and the side marker lamp 25, respectively, and which are fixed to the lamp body 11.

A plurality of light emitting diodes (LEDs) 29 are provided on a part of the base panel 27, which corresponds to the side marker lamp 25, to have a plurality of stages (e.g., three stages in the present embodiment) and a plurality of columns (e.g., four columns in the present embodiment). The LEDs 29 are electrically connected to a driving substrate 31 fixed to the rear surface of the base panel 27. Thus, the light emission of the LEDs 29 is driven (see FIG. 3).

A plurality of LEDs 29 are provided on a part of the base panel 27, which corresponds to the back lamp 21, to have a plurality of stages (e.g., three stages in the present embodiment) and a plurality of columns (e.g., five columns in the present embodiment). The LEDs 29 are electrically connected to a driving substrate (not shown) fixed to the rear surface of the base panel 27. Thus, the light emission of the LEDs 29 is driven.

A plurality of lamp sockets 33a and 33b are fixed to a part of the base panel 27, which corresponds to the brake lamp 23. Bulbs (incandescent lamps, discharge lamps or the like) 35a and 35b are attached to the lamp sockets 33a and 33b, respectively, to face the lamp cover 13 (see FIG. 4).

A reflector integrated extension 37, which is disposed between the lamp cover 13 and the base panel 27, and which serves as a bounding member for bounding a plurality of lamp units (the back lamp 21, the brake lamp 23, and the side marker lamp 25) and a plurality of light sources (the LEDs 29 and the bulbs 35a and 35b), is provided in the lamp chamber 15. The extension according to one or more embodiments of the invention can be a bounding member for bounding at least a plurality of lamp units or a plurality of light sources.

The extension 37 according to the present embodiment constitutes a reflector integrated extension that has a sheet substrate made of a sheet-like material and one or more layers including at least one reflection layer. The reflection layer can be formed by depositing after molding a sheet-like material into a predetermined shape by sheet forming, such as vacuum forming or pressure forming. Alternatively, after a reflection layer is formed on a sheet material by printing or the like, the sheet can be formed into a predetermined shape.

In the present specification, a "sheet" is a thin plastic plate-like material whose thickness is equal to or more than 0.2 mm and is equal to or less than 2 mm. Further, a "film" is defined as a thin film like material whose thickness is less than 0.2 mm. Such a sheet and a film are generically referred to as sheet-like materials. More particularly, a polycarbonate material having ductility and heat-resistance, an acrylonitrile-butadiene-styrene (ABS) resin, and a polypropylene (PP) resin, which are formed so that the thickness thereof is equal to or less than 1 mm, may be used. The use of sheet-like materials is effective in reducing weight.

As illustrated in FIGS. 1 and 2, the entire extension 37 constitutes an extension for bounding the lamp units (the back lamp 21, the brake lamp 23, and the side marker lamp 25). In addition, a back lamp portion 41 corresponding to the back lamp 21, and a side marker lamp portion 43 corresponding to the side marker lamp 25 constitute an extension for bounding the plurality of LEDs 29.

Thus, in a case where the light sources are the LEDs 29, the back lamp portion 41 and the side marker lamp portion 43 can be formed to be an extension that needs no optical design. Further, there is no necessity for considering the heat resistance of the bounding member. Thus, the bounding member can have a shape, which is made similar to the reflector and is freely patterned, around each light source. Consequently, the appearance of the vehicular lamp 100 can be improved.

Furthermore, the extension 37 according to the present embodiment is such that a brake lamp portion 45 corresponding to the brake lamp 23 constitutes an extension reflector corresponding to the plurality of bulbs 35a and 35b.

That is, the extension 37 are configured such that each of unit bounding walls 47a, 47b, 47c, and 47d, which protrude in a light exit direction of the LEDs 29 and the bulbs 35a and 35b, is provided between an associated pair of adjacent lamp units, that each of the light source bounding walls 49a, 49b, 49c, 49d, and 49e, and 51a, 51b, 53a, 53b, and 53c, which protrude in a light exit direction of the LEDs 29 and the bulbs 35a and 35b, is provided between an associated pair of adjacent light sources, and that the unit bounding walls and the light source bounding walls are integrally formed into a predetermined shape using a sheet-like material.

Incidentally, as illustrated in FIG. 4, a reflex reflector 40 can be formed integrally with a part of a surface that faces a vehicle rear side of the extension 37. Consequently, light coming from headlights of a following car behind a user's own car can be reflected by the reflex reflector 40. Thus, the perception of the user's own car is enhanced. Further, the attention of the driver of the following car is alerted. In one or more embodiments, the reflex reflector is fixed to components, such as the lamp body, the lamp cover (outer lens), the extension, and an inner lens, of the vehicular lamp.

Next, a structure for fixing each portion of the extension 37 according to the present embodiment is described below.

Figure 5A:
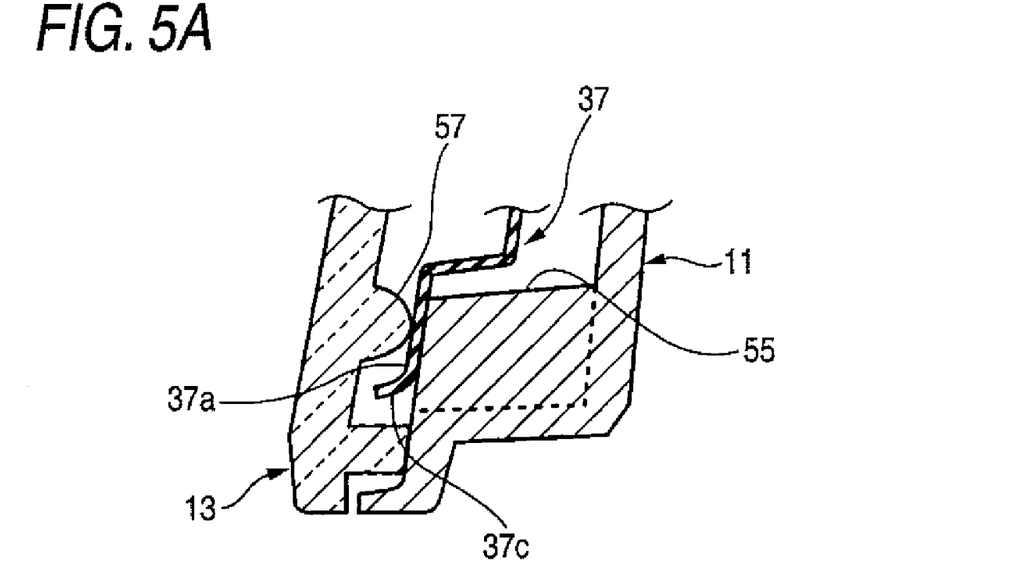
FIG. 5A is an enlarged cross-sectional view of a primary part of a B-part illustrated in FIG. 4.
Figure 5B:
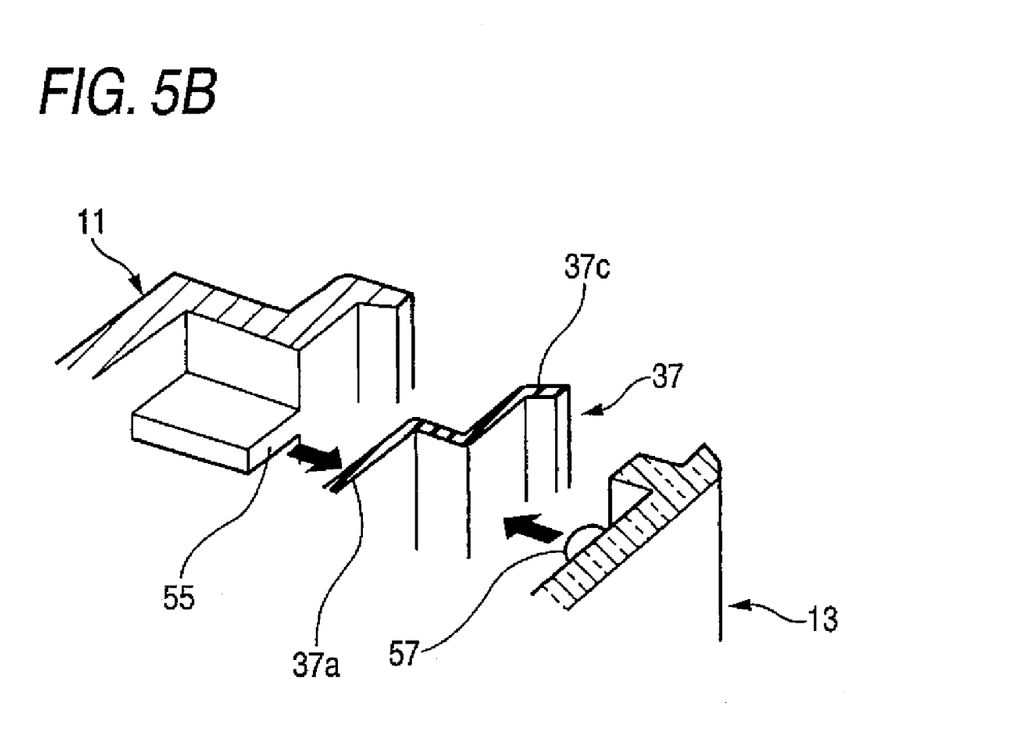
FIG. 5B is an enlarged perspective view of the primary part of the B-part.

FIG. 5A is an enlarged cross-sectional view of a primary part of a B part illustrated in FIG. 4. FIG. 5B is an enlarged perspective view of the primary part of the B part.

Figure 6A:
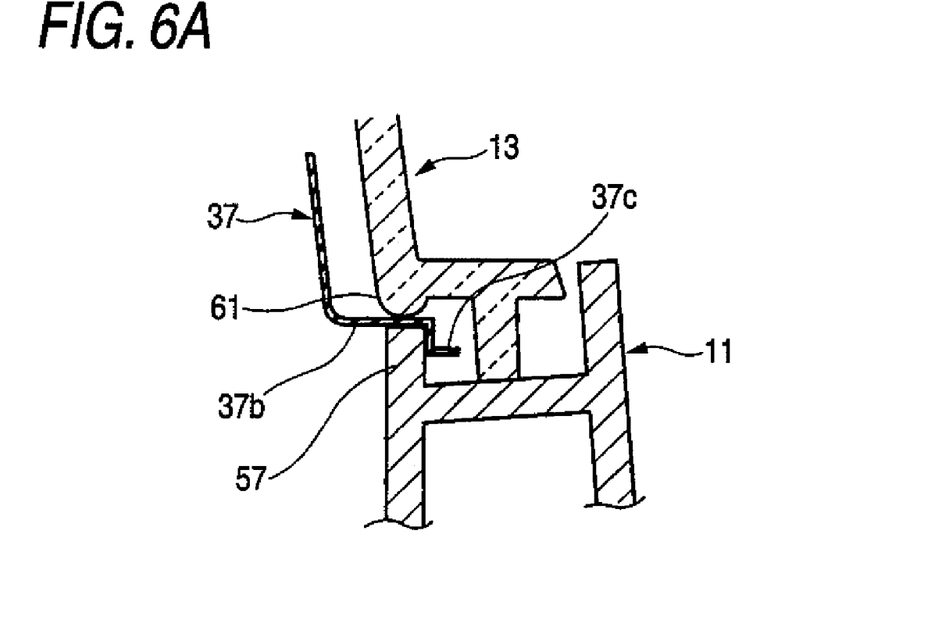
FIG. 6A is an enlarged cross-sectional view of a primary part of a C-part illustrated in FIG. 4.
Figure 6B:
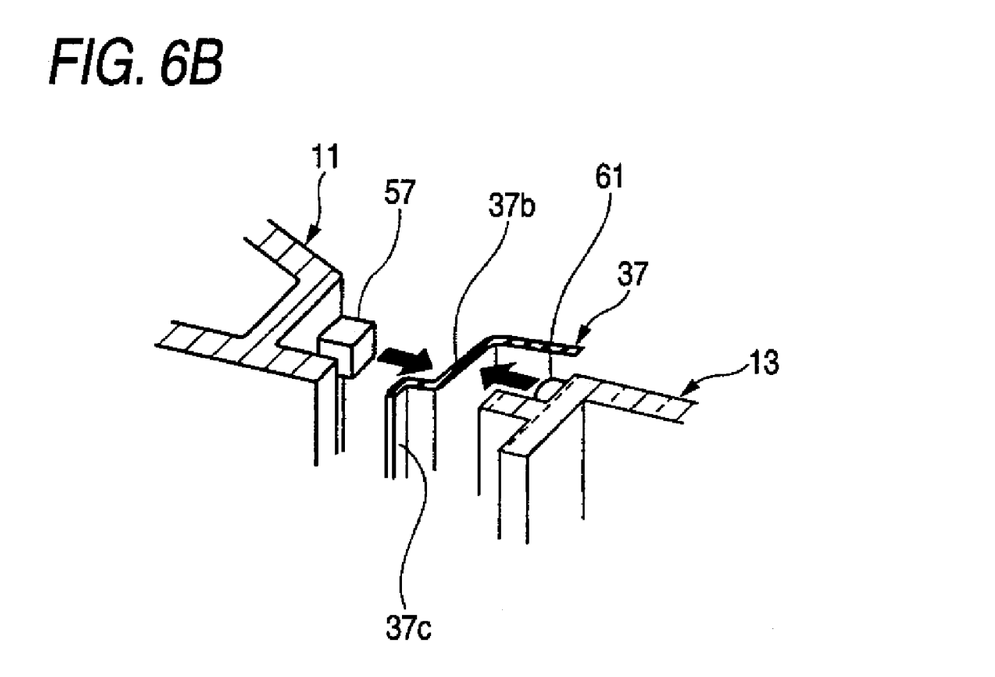
FIG. 6B is an enlarged perspective view of the primary part of the C-part.

FIG. 6A is an enlarged cross-sectional view of a primary part of a C part illustrated in FIG. 4. FIG. 6B is an enlarged perspective view of the primary part of the C part.

As illustrated in FIG. 5A, a peripheral end portion 37a of the extension 37 is sandwiched and fixed by the lamp cover 13 and the lamp body 11. As illustrated in FIG. 5B, a plurality of seat plate portions 55 are formed at appropriate intervals in the lamp body 11. Each seat plate portion 55 and an associated one of projections 57 appropriately provided on the lamp cover 13 to protrude therefrom sandwich and fix the peripheral end portion 37a of the extension 37.

Further, as illustrated in FIG. 6A, a peripheral end portion 37b of the extension 37 is sandwiched and fixed by a projection 57, which has a flat top surface and is provided on the lamp body 11 to protrude therefrom, and a semispherical projection 61 provided on the lamp cover 13, which protrudes therefrom.

In these sandwiching/fixing portions, bent parts 37c for reinforcing the strength of the peripheral edges are formed on the peripheral end portions 37a, 37b of the extension 37, respectively. In one or more embodiments, the base side of each of the bent parts 37c is pinched, for the purposes of preventing a distortion of the extension 37 from spreading, and of preventing the slip-off of a tip end of each of the bend parts 37c.

According to the vehicular lamp 100 of the present embodiment each of unit bounding walls 47a, 47b, 47c, and 47d, which protrude in a light exit direction of the LEDs 29 and the bulbs 35a and 35b serving as the light sources, is provided between an associated pair of adjacent ones of a plurality of lamp units (the back lamp 21, the brake lamp 23, and the side marker lamp 25), that each of the light source bounding walls 49a, 49b, 49c, 49d, and 49e, and 51a, 51b, 53a, 53b, and 53c is provided between an associated pair of adjacent ones of a plurality of light sources (the LEDs 29 and the bulbs 35a and 35b), which protrude in a light exit direction of the LEDs 29 and the bulbs 35a and 35b serving as the light sources, which protrude in a light exit direction of the LEDs 29 and the bulbs 35a and 35b serving as the light sources, and that thus the extension 37 made of the sheet-like material becomes a three-dimensional structure using these bounding walls. Consequently, the extension 37 assures a high stiffness.

Additionally, the extension 37 is integrally formed using the sheet-like material and is reduced in weight Thus, the necessary strength for mounting the extension 37 can be reduced. The mounting of the extension 37 can be achieved using a simple structure illustrated in FIGS. 5A, 5B, 6A and 6B. Consequently, the manufacturing cost and the material cost can be reduced.

Accordingly, the extension 37, such as a large-area reflector integrated extension for a combination lamp, which has a complex shape and a large size can be integrally formed. Thus, the extension 37 can be formed at low cost to have a good looking shape, which is made similar to the reflector and is freely patterned, around each light source. Consequently, the appearance of the vehicular lamp 100 can be improved.

Further, the extension 37 according to the present embodiment is integrally manufactured. Thus, the sheet-like material is formed into a three-dimensional structure. Consequently, a high stiffness can be assured. Further, it is difficult for distortion to occur. Accordingly, the present embodiment can solve the defects in that when a single reflector is manufactured using a sheet-like material, the stiffness is insufficient, and that the reflector is distorted due to vibrations generated during running of the vehicle.

Figure 7:
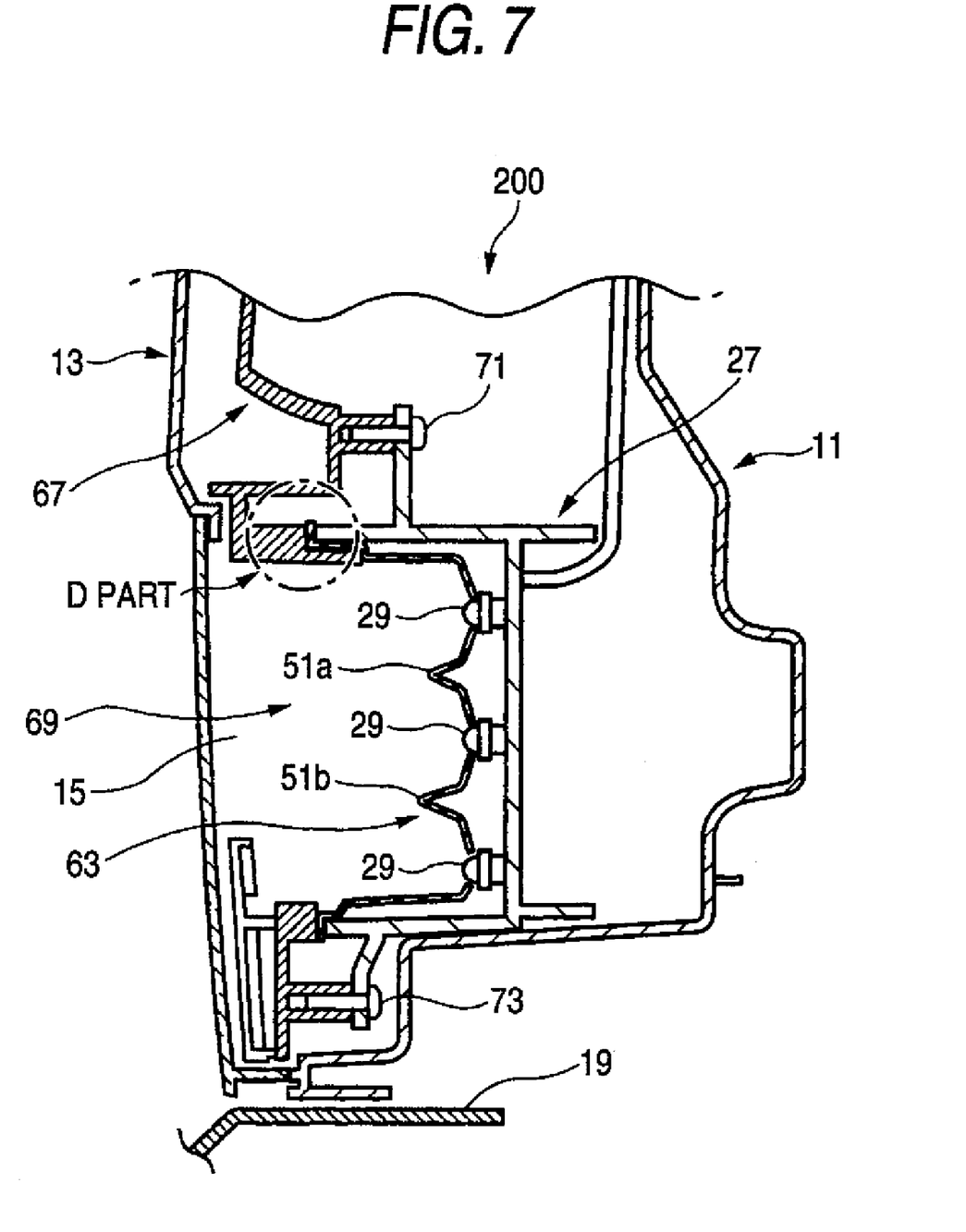
FIG. 7 is a front view illustrating a primary part of a vehicular lamp according to a first embodiment of the invention.
Figure 8A:
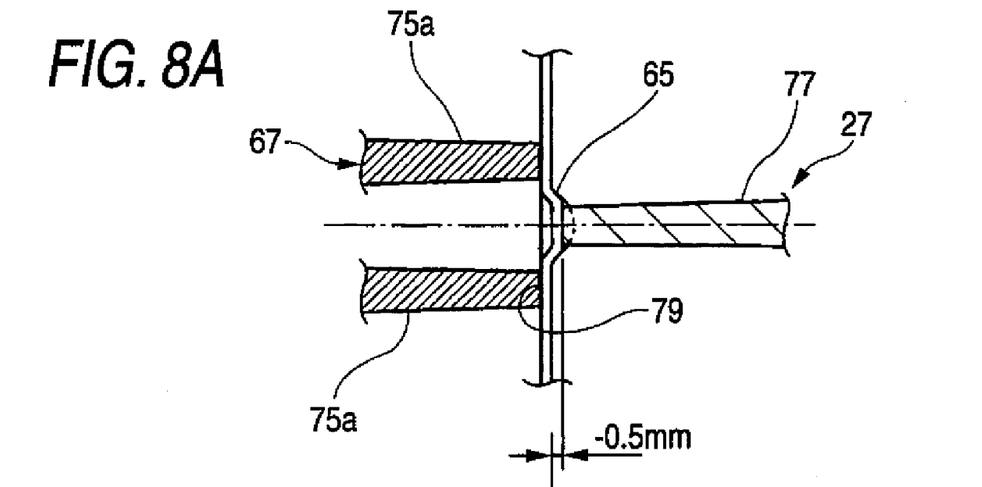
FIGS. 8A to 8C are enlarged explanatory views each illustrating a primary part of a D-part of FIG. 7.
Figure 8B:
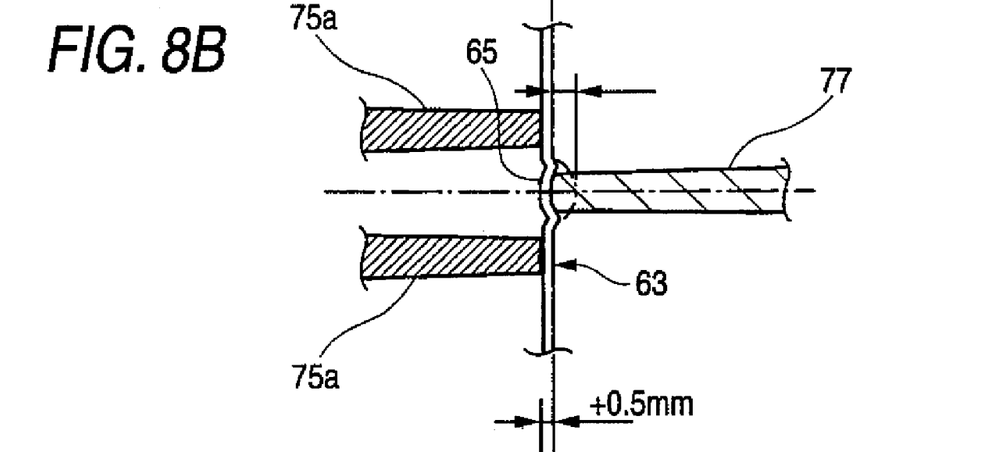
Figure 8C:
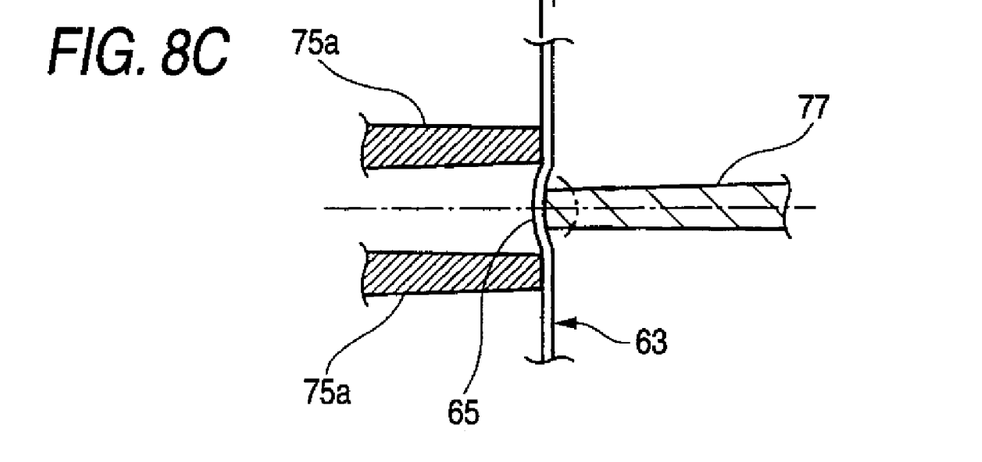

Next, a vehicular lamp according to a second embodiment of the invention is described below. FIG. 7 is a front view illustrating a primary part of a vehicular lamp according to a second embodiment of the invention. FIGS. 8A to 8C are enlarged explanatory views each illustrating a primary part of a D-part of FIG. 7. In each of the embodiments to be described below, each composing member, which is equivalent to an associated composing member of the vehicular lamp 100 according to the aforementioned first embodiment illustrated in FIGS. 1 to 6B, is designated with the same reference numeral as that used to designate the associated composing member of the vehicular lamp 100 according to the first embodiment. Thus, the redundant description of such a composing member is omitted.

As illustrated in FIG. 7, a molded extension 67 is provided together with a film extension 63, which is placed between a lamp cover 13 and a base panel 27 and bounds a plurality of LEDs 29, in a lamp chamber 15 of a vehicular chamber 200 according to the second embodiment. The molded extension 67 is screwed into the base panel 27 at the side of a lamp unit 69, which is supported by and fixed to the lamp body 11, with screws 71 and 73.

The film extension 63 is integrally formed into a predetermined shape using a sheet-like material so that light source bounding walls 51a and 51b protruding in a light exit direction of each of the LEDs 29 are provided between the light sources.

Figure 9:
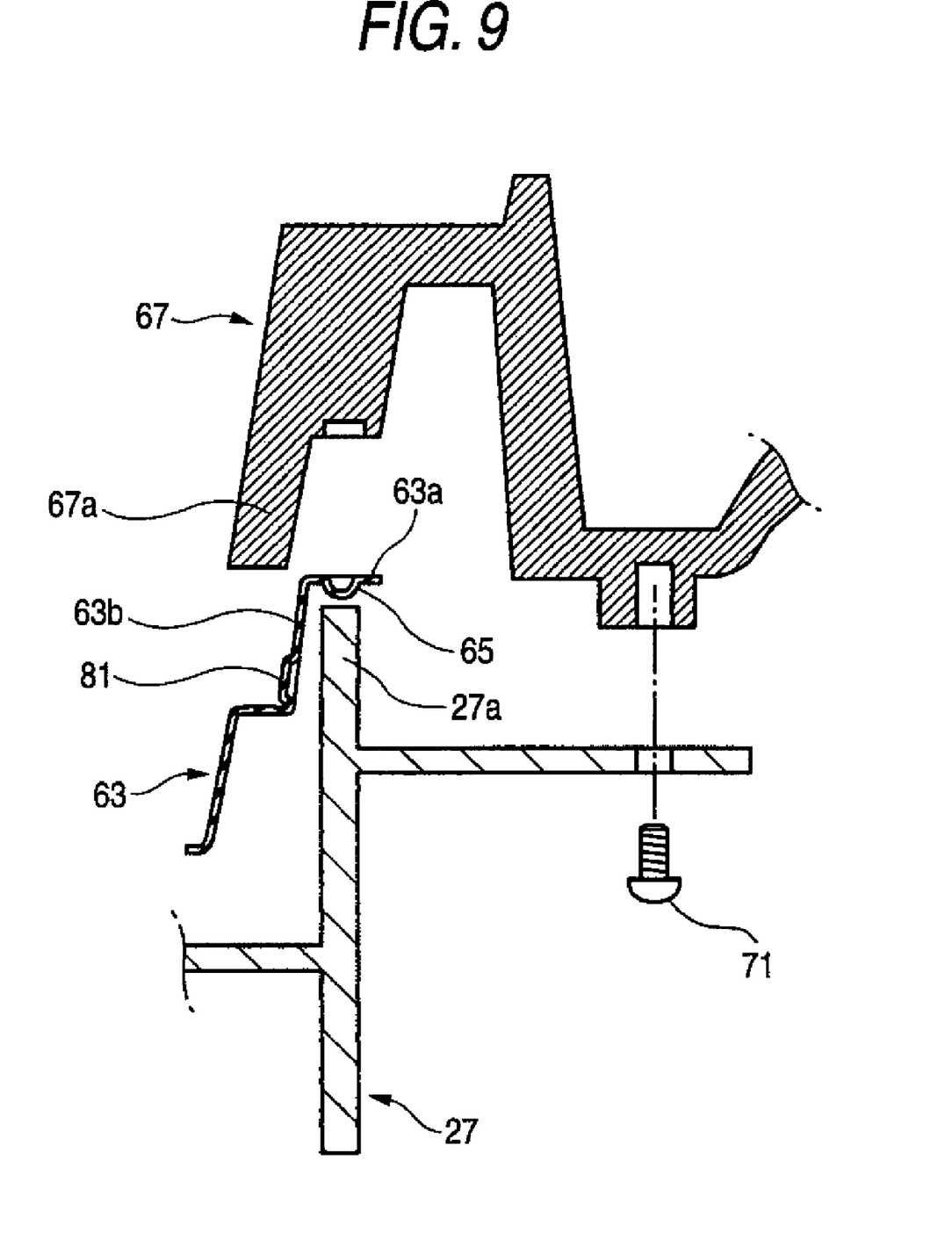
FIG. 9 is an enlarged cross-sectional view illustrating a primary part of a modification of the D-part illustrated in FIG. 7.

As illustrated in FIGS. 8A to 8C, convex portions 65, which are deformable for absorbing assembling errors, are provided at predetermined intervals on the peripheral edge of the film extension 63 (see FIG. 9). The convex portions 65 are formed by concaving, e.g., one of surfaces of a sheet-like material towards the other surface to protrude therefrom. As long as the cross-sectional shape of each of the convex portions 65 is not an acute chevron, any shape can be employed as the shape of each of the convex portions 65.

Further, two ribs 75a and 75a are provided at a predetermined place of the molded extension 67, which corresponds to each of the convex portions 65, to protrude therefrom. One rib 77 is provided on the base panel 27 opposed to the extension 67 so as to protrude therefrom. The rib 77 is protruded to between the ribs 75a, 75a.

As illustrated in FIG. 8A, the film extension 63 is sandwiched by placing the convex portion 65 between the ribs 75a, 75a and causing the rib 77 against the convex portion 65. An imaginary line illustrated in FIG. 8A represents an outer shape of the convex portion 65 in a state before the convex portion 65 is collapsed.

As illustrated in FIG. 8B, the extension 63 is sandwiched and fixed in a state in which the convex portion 65 is collapsed by the ribs 75a, 75a, and 77 reducing the thickness by, e.g., 1.0 mm so that the value of the position of the extension 63 sandwiched and fixed is assumed to be a center value. Further, a fixing structure using the convex portions 65 can fix the extension 63 in a fixed state by collapsing the convex portions 65 even in a case where a minimum error of −0.5 mm from the center value occurs in a direction in which the molded extension 67 and the base panel 27 are away from each other, and where a maximum error of +0.5 mm from the center value occurs in a direction in which the molded extension 67 and the base panel 27 come closer to each other.

That is, the convex portion 65, against the rear surface side (concave portion side) of which the two ribs 75a, 75a of the molded extension 67 abut, is sandwiched by the two ribs 75a, 75a and the one rib 77 of the base panel 27 at the side of the opposed lamp unit 69. Thus, the convex portion 65 can be deformed in a wide range of an amount of deformation from a shape in which the convex portion 65 protrudes towards the one rib 77 to a shape in which the convex portion 65 protrudes towards a place between the two ribs 75a, 75a.

That is, even in a case where a mounting error at the side of the lamp unit 69 is large, a collapsed amount of the convex portion 65 largely changes. Thus, even in the case of using a thin sheet-like material, the extension 63 can be surely sandwiched and fixed. In this case, the relative positions of the molded extension 67 and the film extension 63 are always constant, because the ribs 75a, 75a abut against abutment portions 79 other tan the convex portion 65. Additionally, the film extension 63 is made of a sheet-like material. Thus, even in a case where the convex portion 65 is collapsed, the entire shape of the extension 63 is not affected.

FIG. 9 is an enlarged cross-sectional view illustrating a primary part of a modification of the D-part illustrated in FIG. 7.

The film extension 63 can be provided with a positioning convex portion 81 in addition to the convex portion 65 provided in order to absorb assembling errors.

The positioning convex portion 81 is formed to be smaller than the convex portion 65 for absorbing the assembling errors. Thus, the positioning convex portion 81 is formed by increasing the stiffness so as to be easily collapsed. The positioning convex portion 81 is formed on a surface 63b substantially perpendicular to a surface 63a, on which the convex portion 65 of the film extension 63 is formed, to protrude from the surface 63b. The positioning convex portion 81 is inserted into between a positioning piece 67a of the film extension 67 and a positioning piece 27a of the base panel 27.

Consequently, the positioning convex portion 81 abuts against an opposed surface of the positioning piece 67a, which faces the positioning convex portion 81. Thus, the positioning of the film extension 63 in a direction (lateral direction, as viewed in FIG. 9) perpendicular to an assembling direction is performed.

The vehicular lamp 100 can be configured so that the positioning of the film extension 63 is performed by providing the positioning convex portion 81 on the opposed surface of the positioning piece 67a to protrude therefrom.

Next, a vehicular lamp according to a third embodiment of the invention is described below.

Figure 10A:
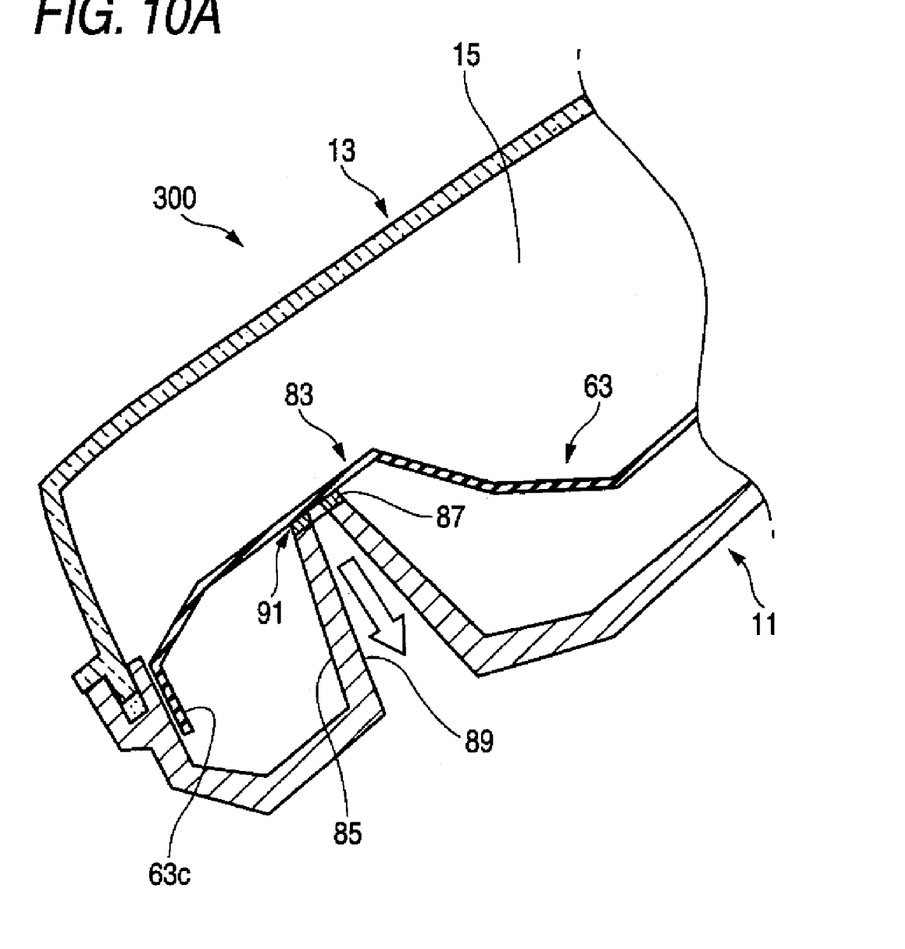
FIGS. 10A and 10B are enlarged cross-sectional views each illustrating a primary part of a vehicular lamp according to a third embodiment of the invention.
Figure 10B:
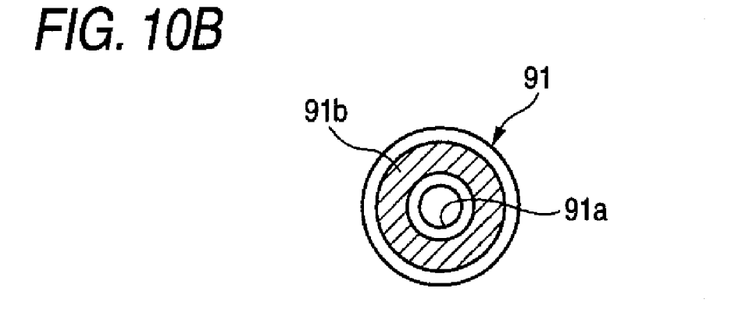

FIGS. 10A and 10B are enlarged cross-sectional views each illustrating a primary part of a vehicular lamp according to the third embodiment of the invention. As illustrated in FIGS. 10A and 10B, a vehicular lamp 300 according to the invention includes a suction fixing portion 83 for fixing the film extension 63 by sucking the rear surface of the extension 63 utilizing suction from the outside of the lamp body 11.

A substantially conical fixing pillar 85, an end of which is a flat surface, is provided on the lamp body 11 serving as a suction fixing portion 83 to protrude to the side of the lamp chamber 15. An end surface of the fixing pillar 85 is a flat bonding seat surface 87. A perforating suction hole 89 extending in an axial direction is formed in the fixing pillar 85. The perforating suction hole 89 is opened in the bonding seat surface 87.

An annular bonding means 91 illustrated in FIG. 10B is stuck to the bonding seat surface 87 to surround the perforating suction hole 89. For example, a double-sided adhesive tape having a central opening portion 91a, around which an annular bonding portion 91b is formed, can be used as the bonding means 91.

In the suction fixing portion 83, the rear surface of the film extension 63 is bonded and fixed to the bonding seat surface 87 via the bonding means 91 by performing vacuum suction from a perforating suction hole 89 of the suction fixing portion 83 after the film extension 63 is disposed at a predetermined assembling position. At that time, preferably, a peripheral end portion 63c of the film extension 63 is a free end in order to avoid deformation.

According to such a suction fixing portion 83, the need for the molded extension 67 and the flange portion, which are used to sandwich and fix the peripheral edge of the film extension 63, is eliminated. A mounting portion of the film extension 63 does not bend. The entire film extension 63 does not bend.

Furthermore, according to such a suction fixing portion 83, not only the vicinity of the peripheral edge of the film extension 63, but also, a desired part of a central portion of the film extension 63 can be fixed to the side of the lamp body 11. Moreover, there is no need for pushing and pressing the film extension 63 from the front side. Thus, when the film extension 63 is mounted, a depositing surface formed on the front surface is neither soiled, nor scratched. Additionally, the bonding surface can be pushed and pressed in a bonding direction by performing suction. Consequently, as compared with fixing using only application of an adhesive agent, the film extension 63 can be more strongly fixed.

Such a suction fixing portion 83 can be used for an A-part of the reflector integrated extension 37, which is illustrated in FIG. 3.

Next, a vehicular lamp according to a fourth embodiment of the invention is described below.

Figure 11:
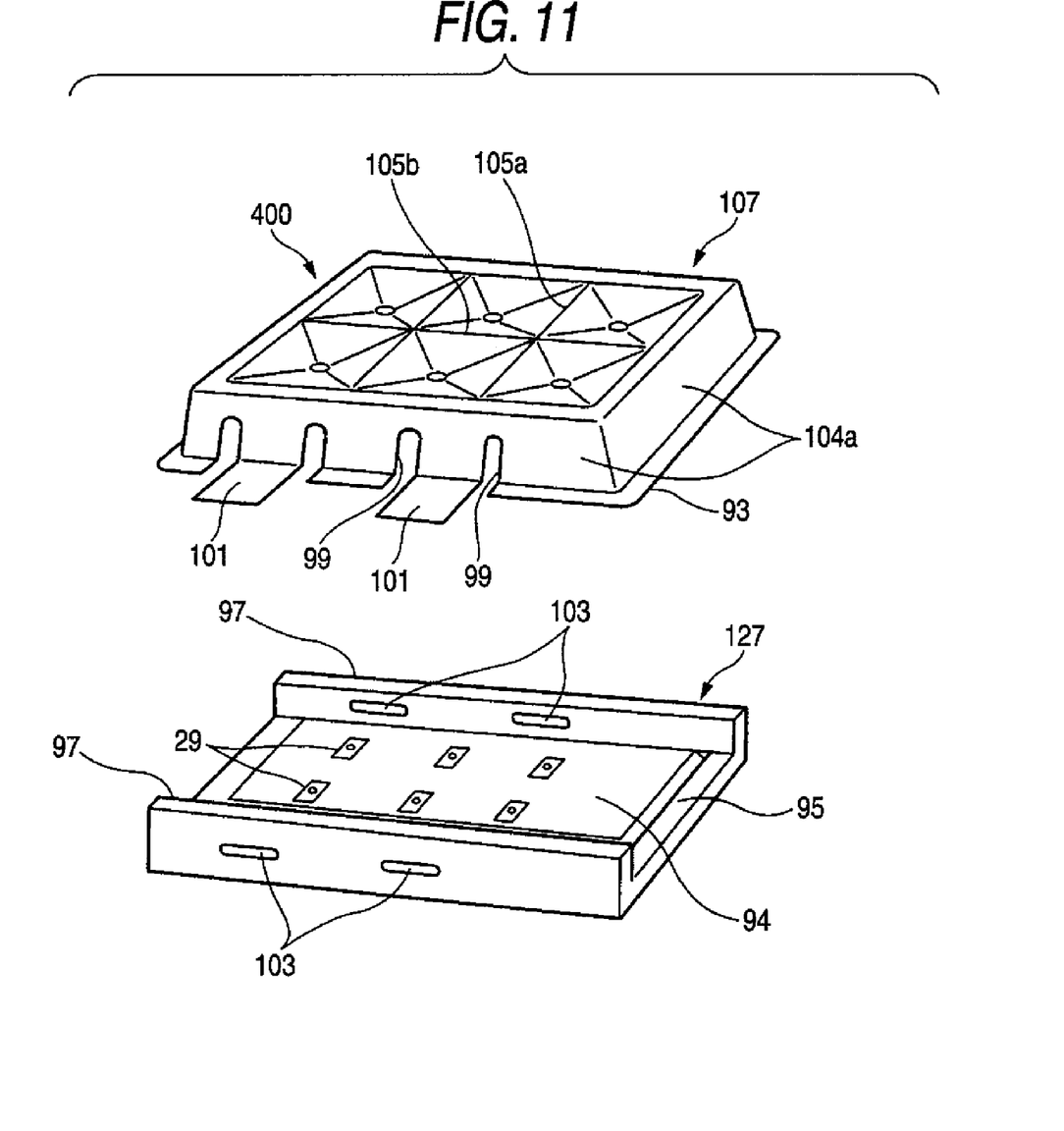
FIG. 11 is an exploded perspective view illustrating a primary part of a vehicular lamp according to a fourth embodiment of the invention.

FIG. 11 is an exploded perspective view illustrating a primary part of a vehicular lamp according to a fourth embodiment of the invention.

As illustrated in FIG. 11, a film extension 107 serving as a bounding member for bounding a plurality of LEDs 29, and a base panel 127 are provided in a lamp chamber of a vehicular lamp 400 according to the fourth embodiment.

As illustrated in FIG. 11, the film extension 107 is configured such that light source defining walls 105a and 105b, which protrude in a light exit direction of each of the LEDs 29, are integrally formed into a predetermined shape using the sheet-like material. A flange portion 93 is formed along a skirt portion of a unit bounding wall 104a provided on the peripheral edge of the film extension 107. In addition, a plurality of catching tongue-like pieces 101 are formed by a pair of parallel notches 99, 99 corresponding to each of the catching tongue-like pieces 101.

A seat surface 95 corresponding to the flange portion 93 of the film extension 107 is formed around an LED substrate 94 in a base panel 127. A pair of holding walls 97, 97 is formed by being erected on parallel side portions of the seat surface 95, respectively. Catching slits 103 each for catching an associated one of the catching tongue-like pieces 101 are provided in the holding walls 97, 97 respectively corresponding to the catching tongue-like pieces 101 of the film extension 107.

Then, the flange portion 93 is caused to abut against the seat surface 95. The film extension 107 is sandwiched between the pair of holding walls 97, 97. In addition, each of the catching tongue-like pieces 101 is caught in the associated catching slit 103. Thus, the positioning of the film extension 107 with respect to the LED substrate 94 can be performed. Simultaneously, the film extension 107 can be fixed to the base panel 27.

According to this fixing structure, the extension can be fixed using the catching tongue-like pieces 101 that utilize an elastic force of the film extension 107 made of a sheet-like material, without using other members, and with a simple configuration.

The configurations of the lamp body, the lamp cover, the lamp units, the light sources, the bounding members, the bounding walls, and the convex portions according to the vehicular lamp of the invention are not limited to those described in the foregoing description of the embodiments. For example, the convex portions can be placed at a central part of each of the bounding members. Those skilled in the art will appreciate that various modifications can be made based on the spirit of the invention.

For example, in the description of the vehicular lamp 200 according to the second embodiment it has been described a case where the convex portion 65 provided on the peripheral edge of the film extension 63 is sandwiched and fixed by the molded extension 67 and the base pane 27. However, the vehicular lamp according to the invention is not limited thereto. The vehicular lamp according to the invention can be configured so that the convex portion 65 is sandwiched by the lamp body 11 and the lamp cover 13 to thereby fix the film extension 63.

Additionally, the vehicular lamp according to one or more embodiments of the invention can be configured so that the film extension 63 is fixed by laser welding or heat welding, instead of being sandwiched and fixed by the molded extension 67 and the base panel 27. In this case, there is no need for providing members, such as the convex portions 65, having complex shapes in the film extension 63. Thus, this configuration is advantageous in cost reduction.

While description has been made in connection with exemplary embodiments of the present invention, those skilled in the art will understand that various changes and modification may be made therein without departing from the present invention. For example, numerical values in the above description of the exemplary embodiments may, of course, be set to different values as is advantageous. It is aimed, therefore, to cover in the appended claims all such changes and modifications falling within the true spirit and scope of the present invention.

[Description of Reference Numerals and Signs]
11 lamp body
13 lamp cover
15 lamp chamber
21 back lamp (lamp unit)
23 brake lamp (lamp unit)
25 side marker lamp (lamp unit)
29 LED (light source)
35a, 35b bulbs (light source)
37 extension (bounding member)
40 reflex reflector
47a, 47b, 47c, 47d unit bounding walls (bounding walls)
49a, 49b, 49c, 49d, 49e light source bounding walls (bounding walls)
63 film extension (bounding member)
100 vehicular lamp

What is claimed is:

1. A vehicular lamp comprising:
a bounding member for bounding at least a plurality of lamp units or a plurality of light sources in a lamp chamber,
wherein said bounding member is integrally formed into a predetermined shape using a sheet-like material so that one or more bounding walls are provided between or among at least said plurality of lamp units or said plurality of light sources,
the vehicular lamp further comprising:
convex portions deformable for absorbing assembling errors provided at predetermined intervals on a peripheral edge of said bounding member;
a lamp body; and
a lamp cover,
wherein the lamp body and the lamp cover fix said bounding member by sandwiching said convex portions.

2. The vehicular lamp according to claim 1, wherein:
said light sources are formed of semiconductor light emitting elements; and
said bounding member constitutes an extension for bounding said plurality of light sources.

3. The vehicular lamp according to claim 2, wherein said bounding member constitutes an extension for bounding said plurality of lamp units.

4. The vehicular lamp according to claim 1, wherein said bounding member constitutes an extension for bounding said plurality of lamp units.

5. The vehicular lamp according to claim 1, wherein said bounding member constitutes an extension formed integrally with a reflector corresponding to said plurality of light sources.

6. The vehicular lamp according to claim 1, wherein the sheet-like material comprises a polycarbonate material having ductility and heat-resistance, an acrylonitrile-butadiene-styrene (ABS) resin, or a polypropylene (PP) resin formed so that the thickness thereof is equal to or less than 1 mm.

7. A vehicular lamp comprising:
a bounding member for bounding at least a plurality of lamp units or a plurality of light sources in a lamp chamber,
wherein said bounding member is integrally formed into a predetermined shape using a sheet-like material so that one or more bounding walls are provided between or among at least said plurality of lamp units or said plurality of light sources,
the vehicular lamp further comprising:
convex portions deformable for absorbing assembling errors provided at predetermined intervals on a peripheral edge of said bounding member; and
two ribs at a side of a molded extension and one rib at a side of a lamp unit fix said bounding member by sandwiching said convex portions.

8. The vehicular lamp according to claim 7, wherein:
said light sources are formed of semiconductor light emitting elements; and
said bounding member constitutes an extension for bounding said plurality of light sources.

9. The vehicular lamp according to claim 7, wherein said bounding member constitutes an extension for bounding said plurality of lamp units.

10. The vehicular lamp according to claim 7, wherein said bounding member constitutes an extension formed integrally with a reflector corresponding to said plurality of light sources.

11. A vehicular lamp comprising:
a plurality of light sources;
a lamp chamber for housing the plurality of light sources; and
a bounding member for bounding the plurality of light sources in the lamp chamber,
the bounding member comprising a sheet-like material integrally formed into a predetermined shape so that one or more bounding walls are provided between or among the plurality of light sources,
the vehicular lamp further comprising:
convex portions deformable for absorbing assembling errors provided at predetermined intervals on a peripheral edge of the bounding member;
a lamp body;
a lamp cover,
wherein the lamp body and the lamp cover fix said bounding member by sandwiching said convex portions.

12. The vehicular lamp according to claim 11,
wherein the light sources comprise semiconductor light emitting elements; and
wherein the bounding member constitutes an extension for bounding said plurality of light sources.

13. The vehicular lamp according to claim 12, further comprising a plurality of lamp units, wherein said bounding member constitutes an extension for bounding said plurality of lamp units.

14. The vehicular lamp according to claim 11, further comprising a plurality of lamp units, wherein said bounding member constitutes an extension for bounding said plurality of lamp units.

15. The vehicular lamp according to claim 11, wherein said bounding member constitutes an extension formed integrally with a reflector corresponding to the plurality of light sources.

16. A vehicular lamp comprising:
a plurality of light sources;
a lamp chamber for housing the plurality of light sources; and
a bounding member for bounding the plurality of light sources in the lamp chamber
the bounding member comprising a sheet-like material integrally formed into a predetermined shape so that one or more bounding walls are provided between or among the plurality of light sources,
the vehicular lamp further comprising:
convex portions deformable for absorbing assembling errors provided at predetermined intervals on a peripheral edge of the bounding member; and two ribs at the side of a molded extension and one rib at a side of a lamp unit fix the bounding member by sandwiching the convex portions.

17. A vehicular lamp comprising:
a plurality of lamp units;
a lamp chamber for housing the plurality of lamp units; and
a bounding member for bounding the plurality of lamp units in the lamp chamber,
the bounding member comprising a sheet-like material integrally formed into a predetermined shape so that one or more bounding walls are provided between or among the plurality of lamp units,
the vehicular lamp further comprising:
convex portions deformable for absorbing assembling errors provided at predetermined intervals on a peripheral edge of the bounding member;
a lamp body;
a lamp cover,
wherein the lamp body and the lamp cover fix said bounding member by sandwiching said convex portions.

18. The vehicular lamp of claim 17, wherein said bounding member constitutes an extension for bounding said plurality of lamp units.

19. The vehicular lamp according to claim 17, further comprising a plurality of light sources, wherein said bounding member constitutes an extension formed integrally with a reflector corresponding to the plurality of light sources.

20. A vehicular lamp comprising:
a plurality of lamp units;
a lamp chamber for housing the plurality of lamp units; and
a bounding member for bounding lamp units in the lamp chamber,
the bounding member comprising a sheet-like material integrally formed into a predetermined shape so that one or more bounding walls are provided between or among the plurality of lamp units,
the vehicular lamp further comprising:
convex portions deformable for absorbing assembling errors provided at predetermined intervals on a peripheral edge of the bounding member; and
two ribs at the side of a molded extension and one rib at a side of a lamp unit fix the bounding member by sandwiching the convex portions.

* * * * *